May 28, 1963     D. B. ROBINSON     3,091,362
MOLDED PULP ARTICLE DENESTING MACHINE Filed July 25, 1960     8 Sheets-Sheet 1

FIG.I.

INVENTOR
David B. Robinson

BY Karl W. Flocks
ATTORNEY

FIG. 2.

INVENTOR
David B. Robinson
BY Karl W. Flocks
ATTORNEY

May 28, 1963 D. B. ROBINSON 3,091,362
MOLDED PULP ARTICLE DENESTING MACHINE
Filed July 25, 1960 8 Sheets-Sheet 3

INVENTOR
David B. Robinson

BY Karl W. Flocks
ATTORNEY

May 28, 1963  D. B. ROBINSON  3,091,362
MOLDED PULP ARTICLE DENESTING MACHINE
Filed July 25, 1960  8 Sheets-Sheet 4

INVENTOR.
David B. Robinson
BY Karl W. Flocks
ATTORNEY

INVENTOR
David B. Robinson

BY Karl W. Flocks
ATTORNEY

May 28, 1963   D. B. ROBINSON   3,091,362
MOLDED PULP ARTICLE DENESTING MACHINE
Filed July 25, 1960   8 Sheets-Sheet 6

INVENTOR
David B. Robinson

BY Karl W. Flocks
ATTORNEY

May 28, 1963 D. B. ROBINSON 3,091,362
MOLDED PULP ARTICLE DENESTING MACHINE
Filed July 25, 1960 8 Sheets-Sheet 7

INVENTOR
David B. Robinson
BY Karl W. Flocks
ATTORNEY

May 28, 1963 D. B. ROBINSON 3,091,362
MOLDED PULP ARTICLE DENESTING MACHINE
Filed July 25, 1960 8 Sheets-Sheet 8

INVENTOR
David B. Robinson

BY *Karl W. Flocks*
ATTORNEY

United States Patent Office 3,091,362
Patented May 28, 1963

3,091,362
MOLDED PULP ARTICLE DENESTING
MACHINE
David B. Robinson, Plattsburgh, N.Y., assignor to Diamond National Corporation, New York, N.Y., a corporation of Delaware
Filed July 25, 1960, Ser. No. 45,033
16 Claims. (Cl. 221—36)

The present invention relates to a method and apparatus for denesting articles, and more particularly to a method and apparatus for denesting and dispensing such articles in which an end article in a stack of articles is deflected along one side thereof so that the natural resiliency of the material of the article will cause both a returning and an ejecting action of that side.

Molded pulp articles, such as trays, have come into wide usage as containers for packaging various food products, particularly such products as meat and vegetables. These containers or trays are generally rectangular in plan form, in one widely used configuration, and have relatively low upwardly and outwardly sloping side walls with an outwardly extending flange at the top of the low walls. For purposes of economy in transportation charges these containers or trays are shipped from the point of manufacture to the point of use in stacks in which the containers nest one within the other.

The trays are, at the present time, removed from a stack one at a time by a manual pulling action. Because this hand removal of the trays can be accomplished only at a relatively slow rate, it is apparent that economies inherent in the low production and shipping costs of the molded pulp tray can be enhanced by the provision of a satisfactory machine and/or method which will effect denesting at a higher rate of speed than is obtainable by the said hand operation. Such a machine, in addition to denesting stacked molded pulp articles, should remove the article without damaging it; should remove articles one at a time; should be capable of denesting molded pulp containers having flanges which are in substantially contacting engagement, or have uneven spacing between adjacent flanges; and should be capable of denesting molded pulp containers even when the containers are warped.

To provide a machine having the above set forth desideratum is among the objects of the present invention.

Another object is to provide a method for the rapid denesting of such articles.

Other objects and the nature and advantages of the present invention will be apparent from the following description taken in conjunction with the accompanying drawings, wherein:

FIG. 5 is a cross-sectional view taken on the line 4—4 of FIG. 2.

Figure 1:
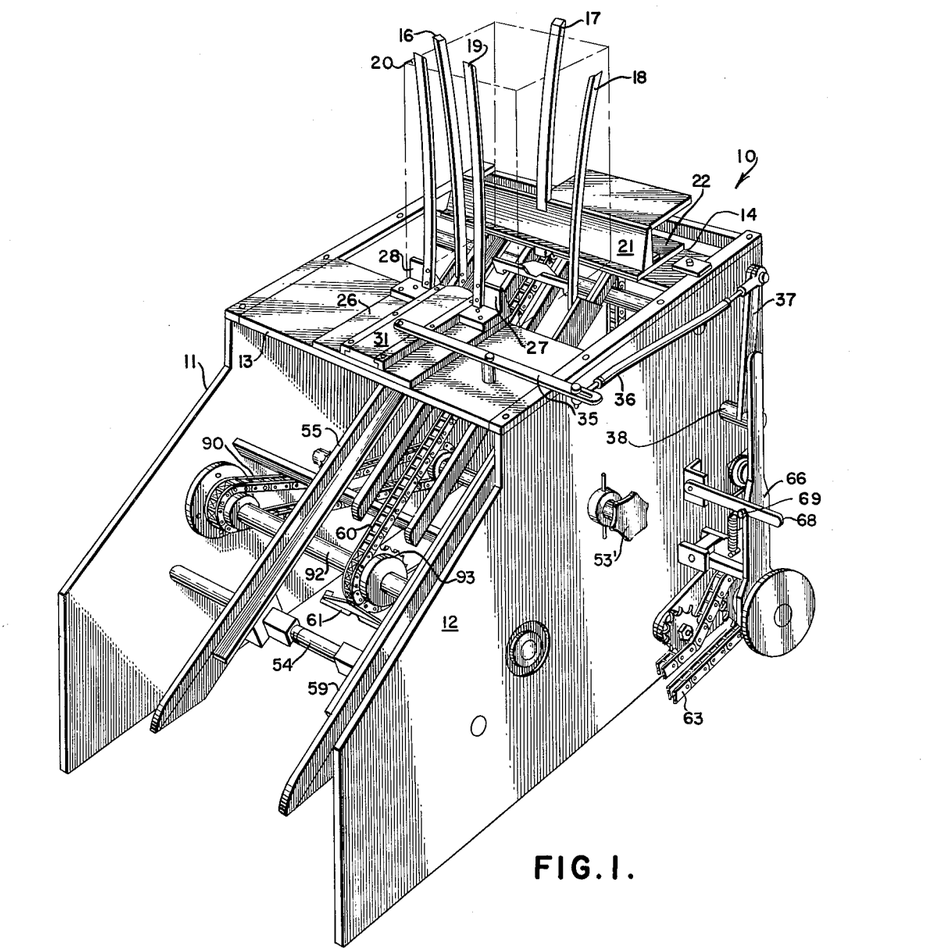
FIG. 1 is a perspective view of a molded pulp article denesting machine in accordance with the present invention.

Referring now to the drawings, wherein like reference characters are used to designate like or corresponding parts throughout the several views, there is shown in FIG. 1 a molded pulp article or container denesting machine 10 having a pair of supporting side plates 11 and 12. These plates support a generally open top or base comprising the top plates 13 and 14.

A magazine is provided on the top or base of the machine 10, this magazine being defined by the outwardly flared rods 16, 17, 18, 19 and 20. These rods are so configured in order to allow for uneven stacking. Rod 17 is secured to a guide plate 21 that rises from support plate 22. As may be seen from FIG. 2, support plate 22 rests on top plate 14 and is adjustably secured thereon by bolts 23. Guide plate 21 is undercut (see FIG. 3) at 24 and plate 22 has a lip 25 extending beyond guide plate 21.

Positioned on and secured to top plate 13 is a support plate 26 to which a pair of auxiliary guides 27 and 28 are attached. The guides 27 and 28 may be seen to extend only a relatively short distance upwardly and are bent out slightly to prevent catching of containers. As will be readily apparent, the rods 16 to 20, the guide plate 21 and the auxiliary guides 27 and 28 are positioned to receive a stack of articles of a generally rectangular configuration.

Figures 3, 10:
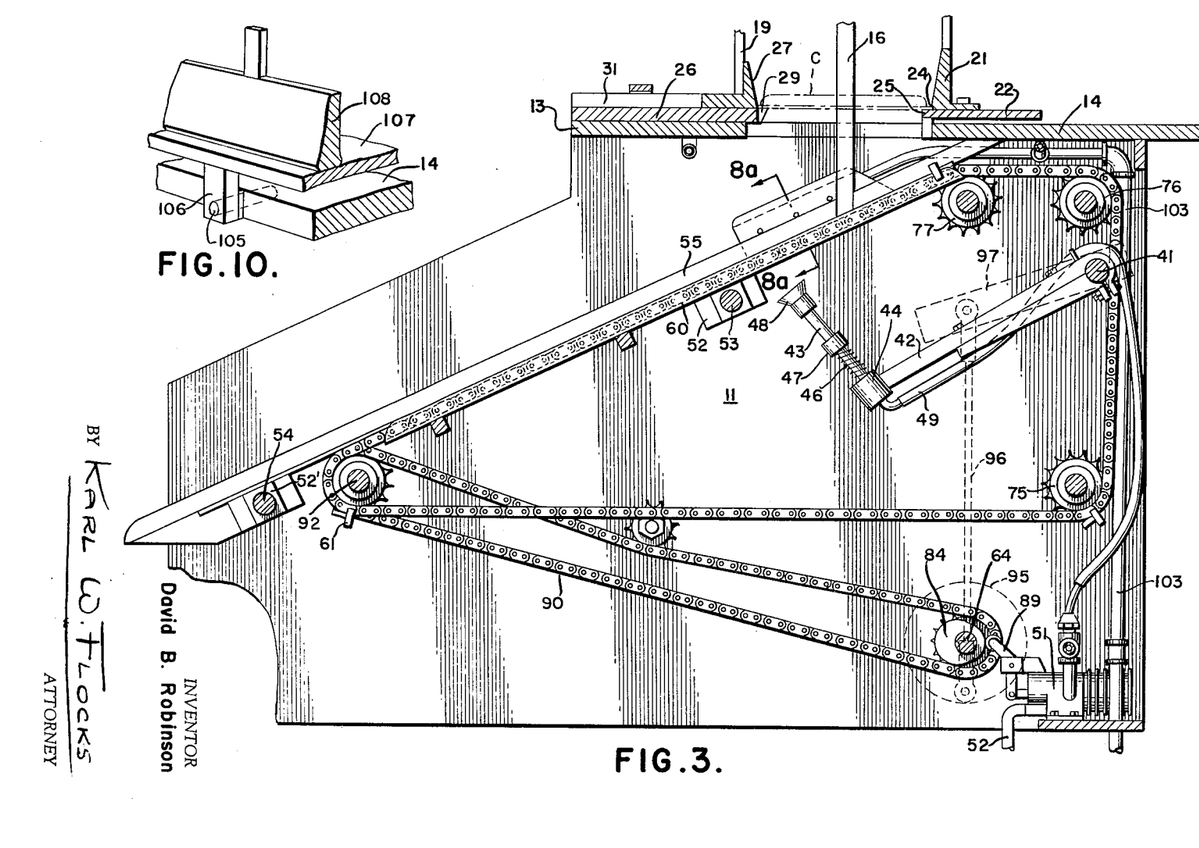
FIG. 3 is a cross-sectional view taken on the line 3—3 of FIG. 2.
FIG. 10 is a fragmentary view of a rocking article support.

The stack of articles or containers C is supported, as may be seen from FIG. 3, by the lip 25 of support plate 22 and by the lip 29 of the plate 26, which extends towards the plate 14 and is in advance of the plate 13 and guides 27 and 28. This support is achieved because the lips 25 and 29 are spaced apart a distance slightly less than the width of the containers C.

Figure 5:
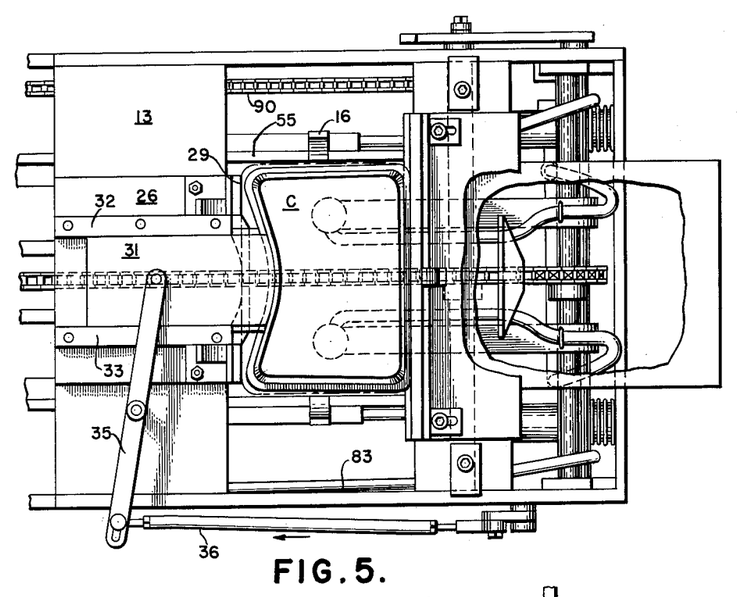
FIG. 5 is a fragmentary plan view, with parts removed, of the machine of FIG. 1.
Figure 6:
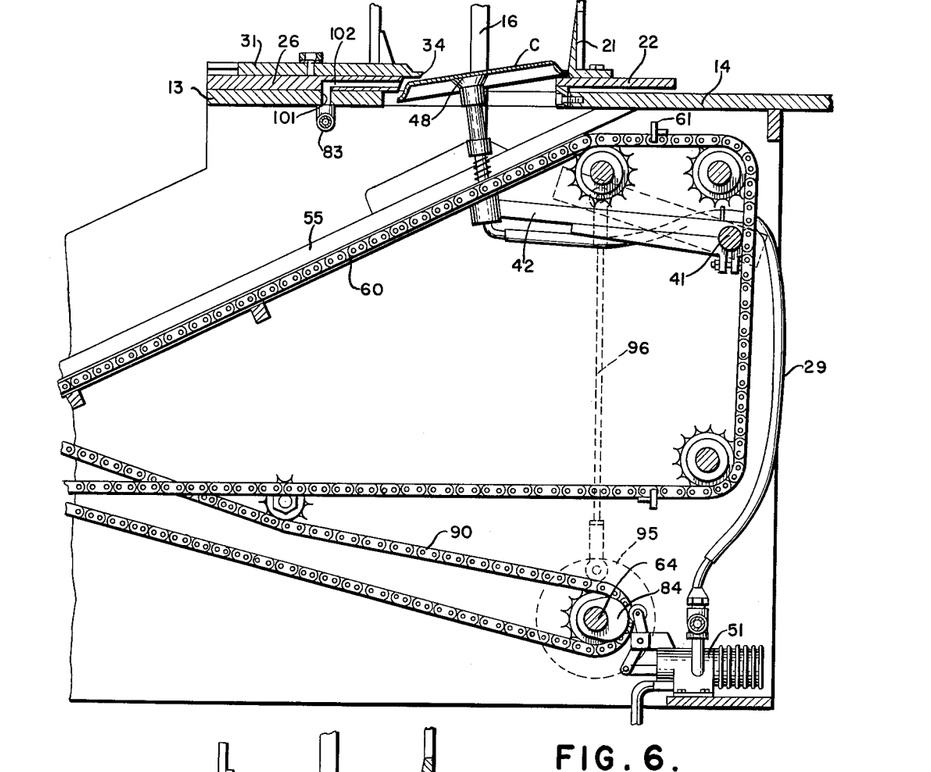
FIG. 6 is a view similar to FIG. 3 and showing a suction cup engaging a molded pulp article that has been partially removed.

Sldably mounted upon support plate 26 is a pusher plate 31 which is slidably held in the guides 32 and 33 and which has a rounded or bowed leading edge 34. Leading edge 34 is thinned and rearwardly inclined, as shown in FIG. 6, and has a length less than the length of the side of container C contacted thereby, as shown in FIG. 5. A lever 35 is pivotally supported intermediate its ends on the plate 13 and has at one end thereof a pivotal connection with plate 31, and has pivotally connected to the other end thereof a link 36. Link 36 is connected to a lever 37 that is mounted on a shaft 38.

A shaft 41 may be seen in FIG. 3 having secured thereto a clamp-arm 42 which carries a suction tube 43 at the outer end thereof. The suction tube 43 is slidably mounted in a sleeve 44 on the end of clamp-arm 42, and a spring 46 bears against a collar 47 which is fixed to the tube 43, and thus the spring 46 urges the tube 43 in a generally upward direction. The upper end of suction tube 43 carries a suction cup 48, and the lower end thereof is connected with a flexible conduit 49 which is in turn connected to a control valve 51. Valve 51 is connected with a source of vacuum (not shown) by the line 52.

Figure 2:
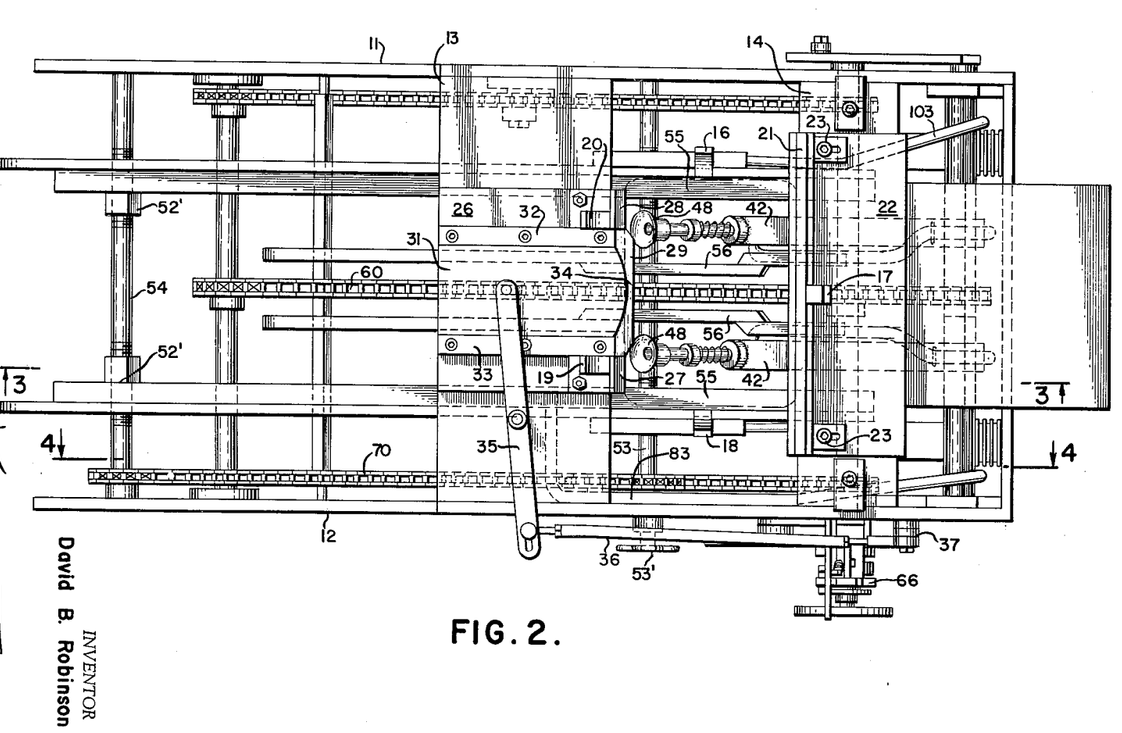
FIG. 2 is a plan view of the machine of FIG. 1.
Figure 8:
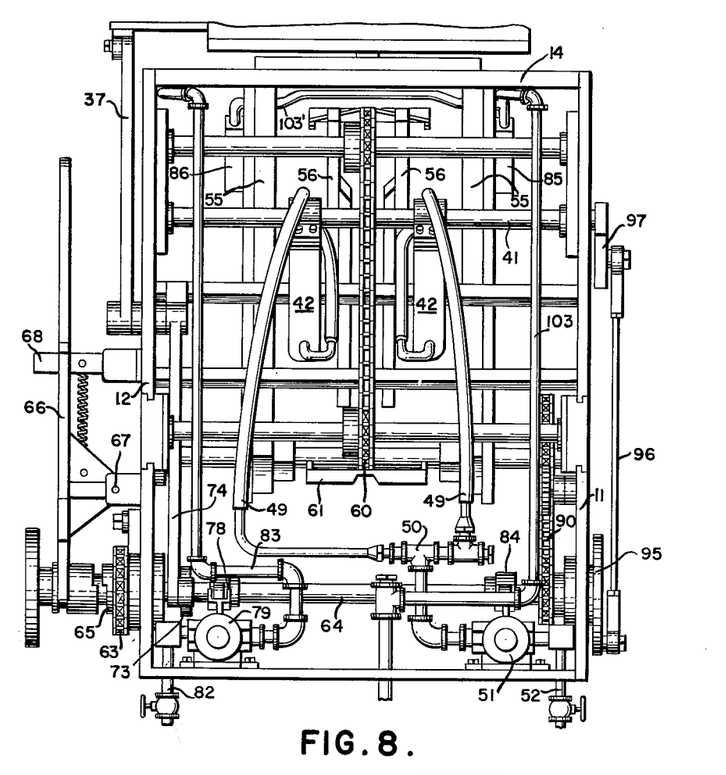
FIG. 8 is a rear elevation of the machine of FIG. 1.

As may be seen from FIGS. 2 and 5, there are in fact provided two such suction cups and attendant parts, as above described, and the two suction cups and their attendant parts have been given the same numerals. In FIG. 8 it will be seen that the conduits 49 are both coupled by the T-connection 50 to the control valve 51.

The shaft 41 is caused to oscillate by a mechanism to be hereinafter described, so as to cause the suction cups 48 to move upwardly through an arc so as to engage the underside of an article or container C. The suction cups 48, in moving through the aforementioned arc, pass between a pair of spaced slide rails 55. Between the slide rails 55 are a pair of runners 56. Thus, as may be seen from FIGS. 2 and 8, the tubes 43 may each pass between a slide rail 55 and a runner 56, and it also may be seen that a chain 60 is positioned between the runners 56. Chain 60 lies in substantially the same plane as slide rails 55 and runners 56, and is provided with a plurality of spaced cleats 61.

The slide rails 55 are adjustable towards or away from each other in order to accommodate containers of different sizes. To accomplish this, these rails 55 are supported by internally threaded blocks, there being an upper block 52 and a lower block 52' for each rail 55, as shown in FIG. 3. The upper blocks 52 are carried by a shaft 53, and the lower block 52' by a shaft 54. The shafts 53 and 54 are each threaded as shown by shaft 54 in FIG. 2, in two spaced sections, the threads being oppositely directed. The shaft 53 has a handle 53' thereon positioned outwardly of plate 12, as may be seen in FIGS. 1 and 2. By turning handle 53', the shaft 53 is rotated to thereby cause the blocks 52 to move toward or away from each other.

Figures 4, 8A:
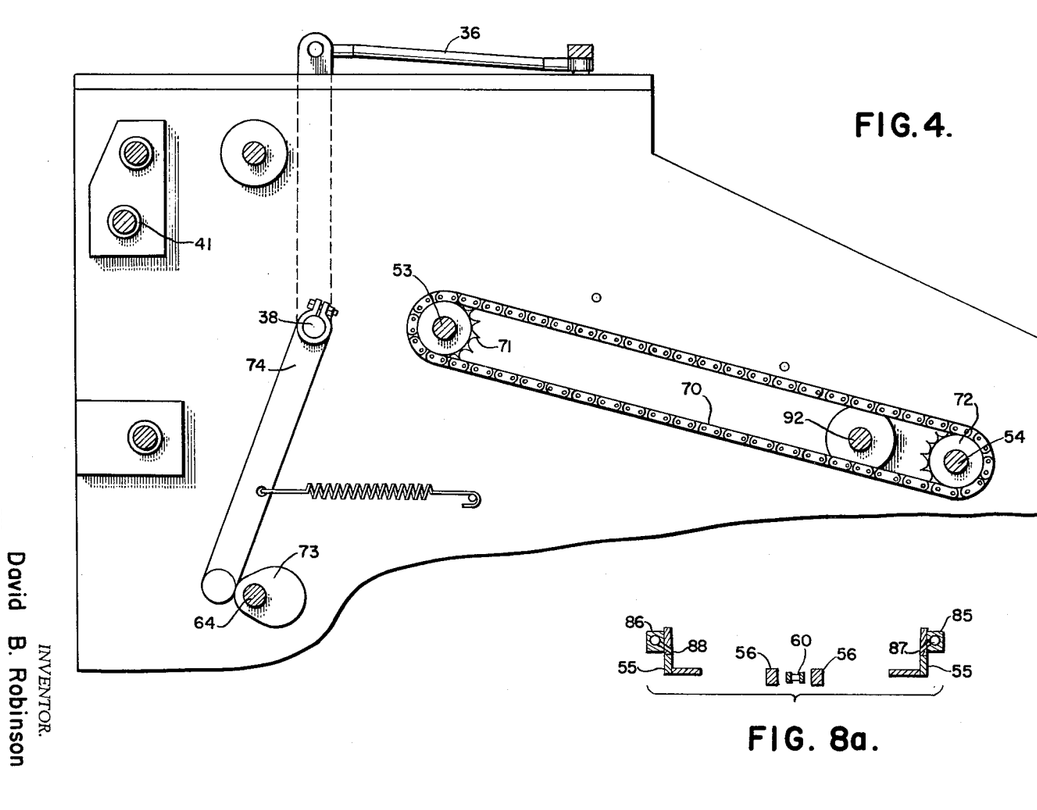
FIG. 8A is a cross-sectional view taken on the line 8A—8A of FIG. 3.

As may be seen in FIG. 4, the shafts 53 and 54 carry sprockets 71 and 72, respectively and around these sprockets is trained a chain 70 for transmitting rotary motion from shaft 53 to shaft 54. Hence, the lower blocks 52' will be caused to move toward or away from each other in phase with the upper blocks 52, to thereby adjust the width of the spacing between rails 55.

To drive various moving parts of the machine there is provided a drive chain 63 (see FIG. 1) which is driven from a source of power (not shown) and which in turn drives the shaft 64. The drive of the shaft 64 is through a clutch 65 (FIG. 8) that is under the control of a yoke lever 66, the lower end of which is fork-shaped and in engagement with one part of the clutch 65. The yoke lever 66 is pivotally supported at 67 to the side plate 12, and has in juxtaposition therewith a locking lever 68. The locking lever 68 has a notch on the lower edge thereof, and a bolt 69 (see FIG. 1) may be caught in the notch of locking lever 68 to thereby retain the yoke lever 66 in a position in which the clutch 65 is disengaged. By raising the locking lever 68, the yoke lever 66 may be rotated to engage the clutch 65.

The shaft 64 has thereon, interiorly of and adjacent side plate 12, a cam 73 which gives an oscillatory movement to the spring urged lever 74. Lever 74 is secured to shaft 38, and thus through linkage previously mentioned drives the pusher plate 31.

Referring again to FIG. 8, there may be seen adjacent the lever 74 a cam 78 for controlling a valve 79 that is connected on the one hand to a line 82 to a source of fluid under pressure and is connected on the other hand to a conduit 83. Thus, the flow of pressure fluid through conduit 83 will be seen to be controlled by the cam 78.

A second cam 84 is positioned on the shaft 64, this cam 84 controlling the valve 51 by the cam follower 89, shown in FIG. 3. Valve 51 controls the supply of vacuum to vacuum cups 48, as noted above.

Figure 9:
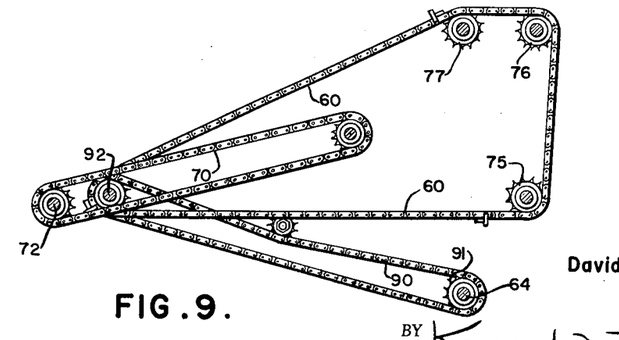
FIG. 9 is a representation of the chain drives of the machine.

Adjacent the side plate 11 there may be seen in FIG. 8 a chain 90 which is trained over a sprocket 91, which may best be seen in FIG. 9. Chain 90 is an intermediate drive chain, and supplies power to a shaft 92. The chain 90 and shaft 92 may best be seen in FIGS. 1, 3 and 9, and it may be seen from FIG. 1 in particular that a sprocket 93 is carried by shaft 92 at the approximate midpoint thereof. Chain 60 is trained on sprocket 93 and on the sprockets 75, 76, 77, shown in FIGS. 3 and 9. Thus, it will be understood that shaft 64 drives the chain 90 which, in turn, drives shaft 92 to effect movement of the chain 60 about sprockets 93, 75, 76 and 77.

Secured to the shaft 64, on the outside of side plate 11, is a crank disc 95 (see FIGS. 3 and 8), crank disc 95 having a crank arm 96 connected thereto and to a lever 97. Lever 97 is secured to shaft 41, and thereby imparts oscillatory movement to the shaft 41, and, through clamp-arms 42, to the suction cups 48.

As may be seen in FIG. 8, the conduit 83 extends upwardly to closely beneath the top plate 14. It then extends forwardly (see FIG. 5) to a point underlying top plate 13. It is connected with an aperture 101 communicating with passages 102 in support plate 26, these passages issuing out of the lip 29 of the support 26.

The conduit 103, which may be seen near the right hand side of machine 10 in FIG. 8, is connected with a source of air under pressure, and with a plenum chamber 85, shown in FIGS. 8 and 8A. A branch conduit 103' connects with a companion chamber 86. The two chambers 85 and 86 are secured respectively above the two slide rails 55, as is shown in FIG. 8A, and spaced blow holes 87, 88 extend into the chambers 85 and 86, respectively. The holes 87, 88 are directed to blow downwardly on to the horizontal parts of the slide rails 55, and on a container placed thereon. This prevents any potential bouncing of the container, and insures engagement of the container by a cleat 61.

In operation the clutch 65 is engaged to thereby cause rotation of the shaft 64. Rotation of shaft 64 will cause the lever 37 to oscillate, by the mechanism shown primarily in FIG. 4, and this in turn will drive the pusher plate 31 to and fro, through the lever 35 and link 36. As the pusher plate 31 advances to the right, the leading edge 34 thereof will engage with the peripheral flange of the lowermost of the containers C of the stack of containers held in the magazine. This will result in the bowing of the long side of the container C, as will be seen in FIG. 5. While the pusher plate 31 is in its forward position, it also serves to support the containers C in the stack of containers thereabove, these containers not being shown for purposes of clarity. The deformation of the container C is such that the edge thereof moves beyond the lip 29 of the support plate 26. This deformation thereby reduces the effective length of the container on the side that is being deformed. This serves to break any holding force between the lowermost container C and the one next to it, particularly at the two corners that are closest to the pusher plate 31. Due to the shape of the containers C and the natural resiliency of the molded pulp material of which the container C is made, the bottommost container C tends to drop or pop downwardly, so that the edge thereof that had been deformed by pusher plate 31 is below the supporting plate 26.

Once this action of the container C has occurred, it will have the position shown in FIG. 5, in which the edge or side thereof opposite the side that was deformed rests upon the lip 25 of supporting plate 22 and of course the other containers C in the nested stack are above it and their corresponding edges are above this opposite edge of the container C. This opposite edge of container C lies in the undercut 25, which serves to prevent an upward movement of the opposite edge of the last few containers in a stack while being deformed by pusher plate 31.

When the container C is in the position shown in FIG. 6, the rotation of shaft 64, through crank disc 95 and crank arm 96, will have caused the clamp arms 42 to rotate upwardly with the shaft 41, thus bringing the suction cups 48 into engagement with the underside of the container C. Due to the sliding or lost motion connection between the suction tubes 43 and the sleeve 44, there need not be an extremely fine adjustment of the machine 10, but instead satisfactory operation will be obtained due to the ability of the suction cups 48 to accommodate themselves to the position of the bottommost container C.

It will be further understood that the rotation of the shaft 64 will have caused the valves 51 and 79 to open, to thereby supply suction to the suction cups 48 and fluid under pressure to the passages 102, respectively. Hence, the blowing of air through the passages 102 will aid in the downward movement or pivoting of the container C so that it may be readily engaged by the suction cups 48.

Figure 7:
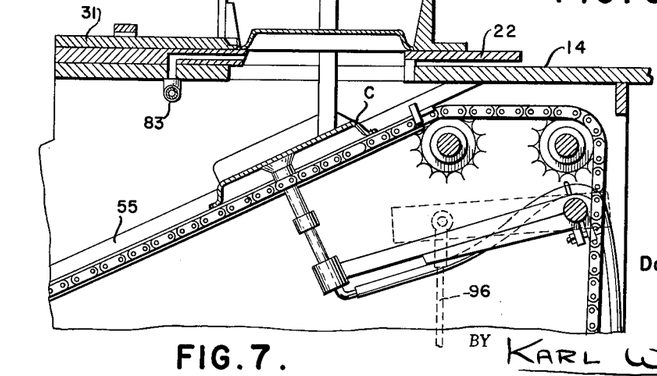
FIG. 7 illustrates the depositing of the molded pulp article on a slide by the suction cup.

Through the continued rotation of shaft 64, the suction cups 48 will be carried downwardly, and they will carry with them the bottommost container C, it having now been extracted from the magazine. At approximately the time when the container C comes into contact with the slide rail 55 and runners 56, which is the position shown in FIG. 7, the valve 51 will have closed, thereby permitting the release of the container C from the suction cups 48. The chain 60, which is moving in the direction of the arrows shown in FIGS. 6 and 7, will bring a cleat 61 into engagement with the rear edge of the container C, and will thereby propel the container C down the slide rails 55 and runners 56 at a more rapid rate than the containers C would slide by gravity.

It sometimes occurs that the containers C are warped, and in such an event there is some danger of the warpage interfering with the proper functioning of the machine. In this connection, attention is invited to the fragmentary perspective view in FIG. 10 of the top plate 14, which has a pin 105 secured in a hole that extends into forward edge thereof. Rotatably mounted on the pin 105 is a support block 106 which has secured to it a support plate 107 that is generally similar to the support plate 23 shown in FIG. 1. Rising from support plate 107 is a guide 108, and it will be observed that the edge of support plate 107 extends to the left of the guide 108 so as to form a container-supporting lip. By virtue of the pivotal connection between support block 107 and pin 105, the support plate 107 and guide 108 may rock as a unit to accommodate any warpage in the containers C in the stack held by the magazine.

Figures 11, 12, 13:
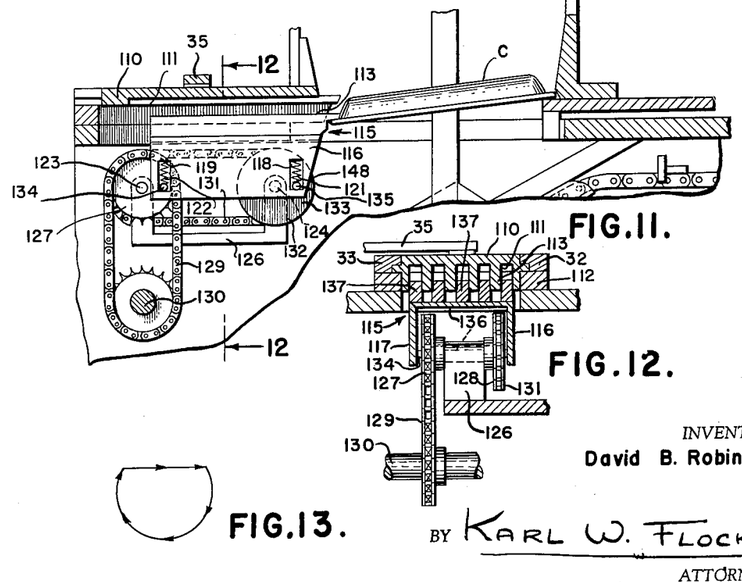
FIG. 11 is an enlarged, cross-sectional and detailed view of an embodiment of the present invention wherein a pull-down member is utilized.
FIG. 12 is a cross-sectional view taken on line 12—12 of FIG. 11.
FIG. 13 is a motion diagram of the pull-down member of FIGS. 11 and 12.

In FIGS. 11 and 12 there is illustrated an embodiment of the invention in which there is a pusher plate and a pull down member to effect both a deflection and a subsequent pulling down of one side of the container C. To this end, there is provided a pusher plate 110 having a plurality of grooves 111 in the bottom surface thereof forming spaced parallel fingers 113 therebeneath. The support plate 112 is disposed beneath plate 110 as seen in FIG. 12. Below the support plate 112 is a pull down member 115, that comprises a pair of downwardly extending side walls 116, 117, each of which is provided with a pair of openings 118, 119, these openings each housing a spring 121, 122.

A pair of spaced parallel axles 123 and 124 are carried by a bracket 126, these axles each supporting two wheels. By referring to FIG. 12, it may be seen that the axle 123 supports wheels 127 and 128, both of which are sprocket wheels. A chain 129 drives the sprocket wheel 127 from a shaft 130 which may be driven in any suitable manner from shaft 64. A chain 131 is trained over the sprocket wheel 128, and drives a sprocket wheel 132 that is mounted on the axle 124. A wheel 133 is mounted on the near end of axle 124, being in the plane of sprocket wheel 127.

From each of the four wheels a pin extends outwardly and each of these four pins is received in one of the aforementioned openings of the side walls 116, 117. Thus, in FIG. 11 there may be seen a pin 134 entering the opening 119 and a pin 135 entering the opening 118.

Upon rotation of the shaft 130, the chain 129 will cause the sprocket wheel 127 to rotate and there will also be rotated axle 123, sprocket wheel 128 and, through chain 131, sprocket wheel 132, axle 124 and wheel 133.

Due to the rotation of the four wheels, the four pins attached thereto will travel in circular paths.

The pull down member 115 also comprises a horizontal plate 136 extetnding between the side walls 116 and 117, this plate carrying a plurality of spaced parallel bars 137 on the upper side thereof. These bars 137 are shaped and positioned to enter into the grooves 111, on the underside of pusher plate 110, between fingers 113.

In operation, the rotation of the wheels to which the pull down member 115 is connected causes the member 115 to rise, the bars 137 entering the grooves 111. The pusher plate 110 and the pull down member 115 then move as a unit horizontally to the right, as shown in FIG. 11, and as diagramatically illustrated in FIG. 13. Horizontal motion of pull down member 115 is permitted because of the lost motion connection between it and the four wheels which drive it, which connection is provided by the openings 118, 119 and the springs 121, 122. As the pusher plate 110 and pull down member 115 translate to the right, the pusher plate 110 engages the container C in the manner hereinabove described. Thereafter, the pull down member 115 will have imparted thereto a downward motion, as may be seen from FIG. 13, and this will pull down the container C as is illustrated in FIG. 11. Thereafter, the pull down member 115 will continue in an arc downwardly and thence back upwardly to the initial position where it will again contact pusher plate 110, the bars 137 again entering into the grooves 111 as aforementioned.

The pulling down of the edge of the container C permits the container to be more readily contacted by the suction cups 48, and in some installations the suction cups and chain 60 may be eliminated, in such cases the extraction of the container from the machine being accomplished by hand. In a machine thus constructed, the deflection of the container will serve to permit the container to be more readily grasped, manually, it being understood, that where necessary, the parts may be positioned otherwise than is herein described to permit entry of the person's hands.

Figure 14:
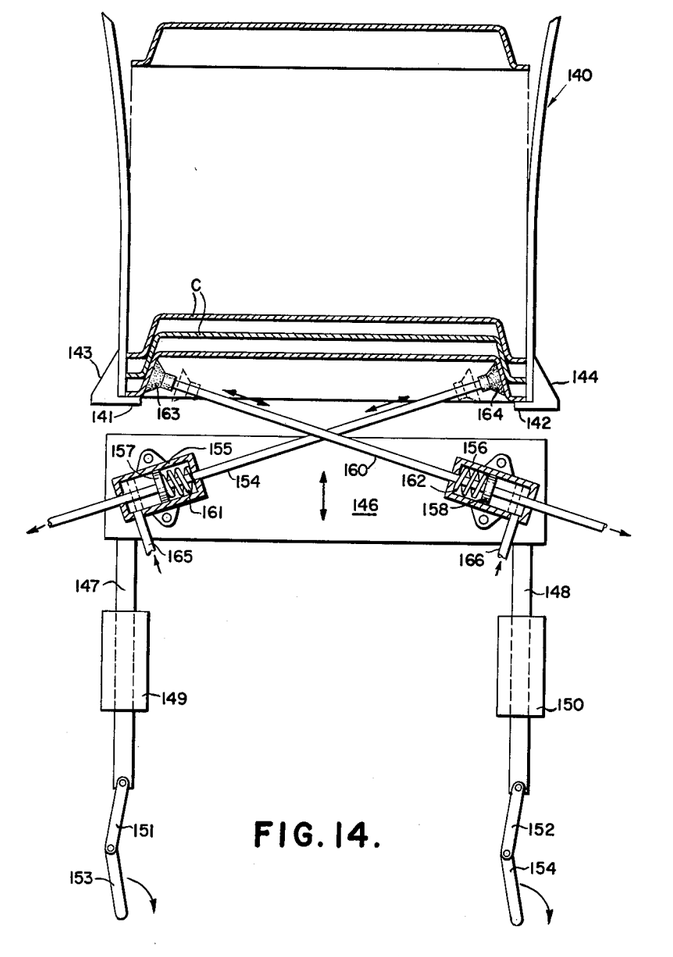
FIG. 14 is an elevational view, with parts in section, of another embodiment of an apparatus in accordance with the present invention.
Figure 15:
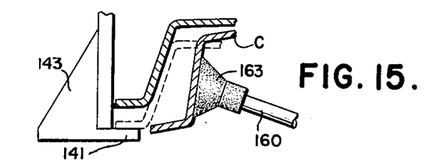
FIG. 15 is a detail view of a part of FIG. 14 in an alternate position.

Another apparatus in accordance with the present invention is shown in FIGS. 14 and 15, this apparatus being capable of denesting articles and/or containers in accordance with the method of this invention. A magazine 140 is provided, and receives a stack of nested, molded pulp containers C, which are held on ledges 141 and 142 of support members 143 and 144. As may be seen, opposite flanges of the lowermost container C rest on the ledges 141 and 142, which will be understood to be shorter than the adjacent container sides.

Below the magazine 140 there is a plate 146 that is carried by rods 147 and 148, which are slidable in guides 149 and 150. The lower ends of the rods 147 and 148 have pivotally connected to them links 151 and 152, which are in turn pinned to crank rods 153 and 154. Rotation of the crank rods 153 and 154 by suitable means will cause the plate 146 to reciprocate towards and away from the magazine 140.

Carried on the plate 146 are a pair of cylinders 155 and 156 each having therein a piston 157 and 158 that carry hollow piston rods 159, 160. Springs 161 and 162 urge the piston rods 159 and 160 downwardly and outwardly, the rods carrying at their upper ends suction cups 163 and 164. The rods 159 and 160 are connected at their ends opposite the suction cups with a suitable source of vacuum, through a control valve, not shown. A source of air under pressure is connected, through a suitable valve, with the cylinders 155 and 156 through the conduits 165 and 166.

In operation, rotation of the crank rods 153 and 154 will cause the plate 146 to move toward the magazine 140 and when it is near the upper limit of its travel, air is introduced into the cylinders 155 and 156 to thereby cause the piston rods 159 and 160 to move upwardly, against the bias of springs 161 and 162. This will cause suction cups 163 and 164 to move into contact with the mid-regions of the sides of the lowermost container C, from the dotted line position to the full line position. Vacuum introduced into the rods 159 and 160 causes the suction cups to adhere to the sides of container C. Plate 146 continues to rise slightly, the air in cylinders 155 and 156 permitted to escape, and the springs 161 and 162 thereby retract the rods 159 and 160. This action, because of the attachment of the suction cups 163 and 164 to the mid-regions of the sides of lowermost container C, will pull, in a generally inwardly horizontal direction, these regions of the sides of the lowermost container C from the dotted line to the full line position shown in FIG. 15. The effective length of the sides of the lowermost container C will thereby be diminished, the flanges of the container C will be pulled within the ledges 141 and 142, and the plate 146 will then lower, thereby removing the bottom container C from the magazine 140. Vacuum is then removed from the suction cups 163 and 164, and the released container C then removed in any desired manner.

There have been provided a method and plural apparatus for effecting the rapid denesting of nested molded pulp articles or containers. Each apparatus disclosed can rapidly move these articles from the vicinity of a magazine. Apparatus in accordance with the present invention may provide for an air blast to aid in the denesting of the articles, and may additionally provide for a member to pull down the article into a position where it may be readily grasped or otherwise removed from the vicinity of the magazine, or may utilize pull down members alone.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for denesting tightly nested articles of molded pulp comprising magazine means for receiving and supporting a stack of tightly nested, inverted rectangular molded pulp containers, said magazine means having a lower aperture, a pair of spaced support plates having spaced, opposed lips for supporting a stack of containers in said magazine means, said lips being spaced apart a distance slightly less than the width of said containers, a pusher plate slidable on one of said support plates in a direction generally perpendicular to a side of a container on said support plates, said pusher plate being thinner than the container, means for moving said pusher plate between a first position in which a leading edge of said pusher plate is withdrawn from contact with a container resting on said support plates and a second position in which the leading edge of said pusher plate extends beyond the edge of said aperture and contacts the container, said pusher plate having a width relatively smaller than the length of the side of the container contacted thereby, elongated support means underlying said magazine means for receiving containers therefrom, suction cup means, means for moving said suction cup means past said elongated support means into engagement with the underside of a container and for retracting said suction cup means and depositing said container on said support means, and an endless, driven chain having a run thereof lying generally in the plane of said elongated support means, said chain having means thereon at spaced intervals for engaging containers deposited on said elongated support means.

2. The apparatus of claim 1, and further including air passages in said support plate underlying said pusher plate, said air passages issuing out of the lip thereof, and means for causing air to flow through said passages.

3. Apparatus for denesting tightly nested articles of molded pulp comprising magazine means for receiving and supporting a stack of tightly nested, inverted rectangular molded pulp containers, a pair of spaced support plates having spaced opposed lips for supporting a stack of containers in said magazine means, said lips being spaced apart a distance slightly less than the width of said containers, said magazine means comprising a plate extending upwardly from one support plate and having an undercut portion overlying said support plate, means for pushing the part of the edge of a container that is in engagement with the other support plate inwardly beyond the lip of said other support plate, said other support plate having a length less than the length of the side of the container resting thereon, elongated support means underlying said magazine means for receiving containers therefrom, suction cup means, means for moving said suction cup means past said elongated support means into engagement with the underside of a container and for retracting said suction cup means and depositing said container on said support means, and an endless driven chain having a run thereof lying generally in the plane of said elongated support means, said chain having means thereon at spaced intervals for engaging containers deposited on said elongated support means.

4. In apparatus for denesting tightly nested articles of molded pulp, magazine means for receiving and supporting a stack of tightly nested, inverted rectangular molded pulp containers, a pair of spaced support plates having spaced, opposed lips for supporting a stack of containers in said magazine means, said lips being spaced apart a distance slightly less than the width of said containers, said magazine means comprising a plate extending upwardly from one support plate and having an undercut portion overlying said support plate, means mounting said one support plate for pivotal movement about a substantially horizontal axis extending transversely of the lip thereof, means for pushing the part of the edge of a container that is in engagement with the other support plate inwardly beyond the lip of said other support plate, said other support plate having a length less than the length of the side of the container resting thereon.

5. Apparatus for denesting tightly nested articles of molded pulp comprising magazine means for receiving and supporting a stack of tightly nested, inverted rectangular molded pulp containers, said magazine means including a lower aperture, a pair of spaced support plates having spaced, opposed lips for supporting a stack of containers in said magazine means, said lips being spaced apart a distance slightly less than the width of said containers, a pusher plate slidable on one of said support plates in a direction generally perpendicular to a side of a container on said support plate, means for moving said pusher plate between a first position in which a leading edge of said pusher plate is withdrawn from contact with a container resting on said support plate and a second position in which the leading edge of said pusher plate extends beyond the edge of said aperture and contacts the container, said pusher plate having a width relatively smaller than the length of the side of the container contacted thereby, said pusher plate having a plurality of grooves on the underside thereof, a pull down member comprising a plurality of bars, registerable with said grooves, means for moving said pull down member with said pusher plate between the first and second positions thereof and for then moving said member downwardly to pull downwardly the part of the container which was engaged by said pusher plate, elongated support means underlying said magazine means for receiving containers therefrom, suction cup means, means for moving said suction cup means past said elongated support means into engagement with the underside of a container and for retracting said suction cup means and depositing said container on said support means, and an endless driven chain having a run thereof lying generally in the plane of said elongated support means, said chain having means thereon at spaced intervals for engaging containers deposited on said elongated support means.

6. In apparatus for denesting tightly nested articles of molded pulp, magazine means for receiving and supporting a stack of tightly nested, inverted rectangular molded pulp containers, said magazine means including a lower aperture, a pair of spaced support plates having spaced, opposed lips for supporting a stack of containers in said magazine means, said lips being spaced apart a distance slightly less than the width of said containers, a pusher plate slidable on one of said support plates in a direction generally perpendicular to a side of a container on said support plate, means for moving said pusher plate between a first position in which a leading edge of said pusher plate is withdrawn from contact with a container resting on said support plate and a second position in which the leading edge of said pusher plate extends beyond the edge of said aperture and contacts the container, said pusher plate having a width relatively smaller than the length of the side of the container contacted thereby, said pusher plate having a plurality of grooves on the underside thereof, a pull down member comprising a plurality of bars, registerable with said grooves, means for moving said pull down member with said pusher plate between the first and second positions thereof and for then moving said member downwardly to pull downwardly the part of the container which was engaged by said pusher plate.

7. The apparatus of claim 6, said last mentioned means comprising a pair of crank means, plate means having a pair of vertical apertures therein, pins on said crank means in said apertures, and spring means urging said pins towards the bottoms of said apertures.

8. The apparatus of claim 6, said magazine means comprising a plate extending upwardly from the other support plate and having an undercut portion overlying said other support plate.

9. Apparatus for denesting tightly nested articles of molded pulp comprising magazine means for receiving and supporting a stack of tightly nested, inverted rectangular molded pulp containers, said magazine means including a lower aperture, a pair of spaced support members having spaced, opposed lips for supporting a stack of containers in said magazine means, said lips being spaced apart a distance slightly less than the width of said containers, pusher plate means for pushing the part of the edge of a container that is in engagement with one said support member inwardly beyond the leading edge of said one support member, said one support member having a length less than the length of the side of the container resting thereon, and means for urging downwardly the edge of the container engaged by said pusher plate means, means for moving said pusher plate means between a first position in which a leading edge of a said pusher plate means is withdrawn from contact with a container resting on said support member and a second position in which the leading edge of said pusher plate means extends beyond the edge of said aperture and contacts the container, said pusher plate means having a width relatively smaller than the length of the side of the container contacted thereby, elongated support means underlying said magazine means for receiving containers therefrom, suction cup means, means for moving said suction cup means past said elongated support means into engagement with the underside of a container and for retracting said suction cup means and depositing said container on said support means, and an endless driven chain having a run thereof lying generally in the plane of said elongated support means, said chain having means thereon at spaced intervals for engaging containers deposited on said elongated support means.

10. The apparatus of claim 9, said urging means comprising a pull down member, and means for moving said pull down member downwardly after the container has been engaged by said pusher plate means.

11. The apparatus of claim 9, said urging means includes air blast means.

12. In apparatus for denesting tightly nested tray-like articles of molded pulp, vertically disposed magazine means for receiving a stack of inverted rectangularly conformed, nested molded pulp articles, opposed parallel ledge means below said magazine means for supporting the lowermost article of the stack, deforming means reciprocally supported above one of said ledge means in a path of travel normal to said magazine means for deflecting inwardly an adjacent wall of the lowermost article to thereby disengage that wall from the container thereabove and the ledge upon which it is supported, vertically pivotal suction means engageable between said ledge means for engaging beneath said deformed article for removing the lowermost deformed article from said stack, and power means connected to said deforming means and suction means for sequentially operating the same.

13. In apparatus for denesting a vertically disposed stack of rectangular, tray-like articles having a peripheral flange, converging side walls and a bottom substantially normal to said side walls, a vertically disposed magazine for receiving a nested stack of the inverted tray-like articles, opposed parallel ledge means at a lower portion of said magazine and extending into said magazine for engaging beneath the peripheral flange portions of opposed sides of the lowermost tray-like article and supporting said inverted stack of tray-like articles in said magazine, laterally-displaceable, article-deforming means extendable into said magazine in a plane normal thereto and disposed immediately above one of said ledge means for deforming the side of the lowermost article supported on said one ledge means and deflecting the article below said one ledge means, vertically pivotal suction means mounted for oscillation beneath said magazine and including suction cups positionable between said ledge means when said article-deforming means is extended into said magazine for engaging the lowermost deformed article and transporting it from beneath said magazine means, and power means connected to said article-deforming means and suction cup means for periodically disposing the article-deforming means into article-deforming relationship with the lowermost article in said magazine and positioning the suction cup means into engagement with the deformed article for transporting the same downwardly from said ledge means.

14. Denester apparatus for supporting a vertical stack of nested, rectangular trays in which the trays include opposed, parallel deformable sidewalls, comprising a housing including a horizontal support having a transverse opening therethrough, magazine means extending vertically from said support above said opening, a pair of opposed, parallel, fixed lip means projecting over said support opening from opposite sides thereof for supporting a stack of nested trays thereon beneath the opposed, parallel deformable walls thereof, pusher plate means reciprocally supported on said support for horizontal movement thereover immediately above one of said lip means and extendable into said magazine means for deforming one side wall of the lowermost tray supported on said one lip means, tray transport means pivotally mounted on a horizontal axis of oscillation and including suction cup means positionable between said fixed lip means immediately below said magazine means for engaging and transporting the lowermost deformed tray downwardly therefrom and drive means connected to said pusher plate and tray transport means including mechanical means sequentially timing movement of said pusher plate means in relation to movement of said suction cup means.

15. The structure of claim 14 in which said pusher plate means includes an arcuate, leading edge overlying said one lip means for insuring inward deformation of the adjacent deformable side wall of the lowermost tray.

16. The structure of claim 14 in which said tray transport means comprises a shaft extending parallel to and below said horizontal support, an arm extending radially from said shaft, and a suction tube extending angularly from said arm upon which said suction cup means is mounted.

References Cited in the file of this patent

UNITED STATES PATENTS

| | | |
|---|---|---|
| 1,134,651 | Tramell | Apr. 6, 1915 |
| 1,229,733 | Errett | June 12, 1917 |
| 1,590,926 | Cooley | June 29, 1926 |
| 1,627,837 | Cooley | May 10, 1927 |
| 1,698,239 | Morin | Jan. 8, 1929 |
| 1,726,813 | Endter | Sept. 3, 1929 |
| 1,959,327 | Adams | May 22, 1934 |
| 1,979,089 | Adams | Oct. 30, 1934 |
| 2,390,298 | Glassner | Dec. 4, 1945 |
| 2,653,743 | Stenger | Sept. 29, 1953 |
| 2,734,657 | Drese | Feb. 14, 1956 |
| 2,816,760 | Seragnoli | Dec. 17, 1957 |
| 2,848,138 | Caswell et al. | Aug. 19, 1958 |
| 2,937,786 | Muller | May 24, 1960 |
| 2,954,900 | Brubaker | Oct. 4, 1960 |